(12) United States Patent
Levin et al.

(10) Patent No.: US 8,661,800 B2
(45) Date of Patent: Mar. 4, 2014

(54) METHOD OF COLLECTION AND REUSE OF EXHAUST HEAT IN A DIESEL-POWERED VEHICLE

(75) Inventors: Michael Levin, Ann Arbor, MI (US); Furqan Zafar Shaikh, Troy, MI (US); Donald Masch, White Lake, MI (US); Danrich Henry Demitroff, Okemos, MI (US); James Patrick O'Neill, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

(21) Appl. No.: 13/442,780

(22) Filed: Apr. 9, 2012

(65) Prior Publication Data

US 2013/0263574 A1  Oct. 10, 2013

(51) Int. Cl.
*F01N 3/00* (2006.01)
*F01N 3/02* (2006.01)
*F01N 3/20* (2006.01)
*H01L 35/30* (2006.01)
*F01N 5/02* (2006.01)

(52) U.S. Cl.
USPC .................. 60/320; 60/321; 60/324; 136/205

(58) Field of Classification Search
USPC .............................. 60/320, 321, 324; 136/205
See application file for complete search history.

(56) References Cited

U.S. PATENT DOCUMENTS

| | | | |
|---|---|---|---|
| 5,492,190 A * | 2/1996 | Yoshida | 180/65.245 |
| 5,566,774 A * | 10/1996 | Yoshida | 180/65.245 |
| 6,464,027 B1 | 10/2002 | Dage et al. | |
| 8,151,555 B2 * | 4/2012 | Niimi et al. | 60/286 |
| 2006/0053771 A1 | 3/2006 | Murata | |
| 2009/0241863 A1 | 10/2009 | Kimura et al. | |
| 2009/0293465 A1 * | 12/2009 | Niimi et al. | 60/320 |
| 2009/0308059 A1 | 12/2009 | Ikemoto | |
| 2009/0315518 A1 * | 12/2009 | Soma et al. | 320/134 |
| 2010/0077741 A1 * | 4/2010 | Samuel | 60/320 |
| 2011/0131962 A1 | 6/2011 | Toi et al. | |
| 2011/0307137 A1 * | 12/2011 | Bryan et al. | 701/22 |
| 2011/0320082 A1 * | 12/2011 | Ishishita | 701/22 |

* cited by examiner

*Primary Examiner* — Thomas Denion
*Assistant Examiner* — Dapinder Singh
(74) *Attorney, Agent, or Firm* — Julia Voutyras; Alleman Hall McCoy Russell & Tuttle LLP (57) ABSTRACT

A heat transfer method for an engine is disclosed herein utilizing a heat battery configured to store waste exhaust heat in phase-chase materials for use during a subsequent engine start. By reusing waste exhaust heat in this manner, exhaust emissions may be reduced, and delays in heating the vehicle cabin and other vehicle systems after engine start may be reduced.

20 Claims, 6 Drawing Sheets

METHOD OF COLLECTION AND REUSE OF EXHAUST HEAT IN A DIESEL-POWERED VEHICLE

BACKGROUND AND SUMMARY

Motor vehicles powered by internal combustion engines may waste over 30% of fuel energy due to the venting of exhaust heat to the environment.

To reduce wasted fuel energy, vehicles may recover engine exhaust heat for transfer to various other vehicle systems. For example, US 2009/0241863 describes storing high temperature cooling water in a heat accumulator, which is used to warm up a vehicle engine at engine start. After engine start, exhaust heat is recovered and transferred to cooling water. This heated cooling water is then circulated to the engine to provide further engine warming, and to a heater circuit to heat air supplied to a passenger compartment. In this way, both the engine and the passenger compartment can be warmed up soon after engine start.

However, the inventors herein have recognized that such an approach, where exhaust heat is transferred away from the exhaust system soon after engine start, may increase undesirable exhaust emissions. For example, transferring exhaust heat to cooling water and thus away from the exhaust system may delay catalytic converter "light-off", which is temperature-dependent. As a result, it may take longer for the catalytic converter to reach a temperature where it can efficiently perform catalytic reduction, thus increasing undesirable exhaust emissions. This delay and associated effect on emissions may be especially pronounced in vehicles with diesel engines, which may output less exhaust heat than other types of engines.

To address the above issues, the inventors herein have identified various approaches for recovering engine exhaust heat for transfer to various other vehicle systems without increasing undesirable exhaust emissions by delaying catalytic converter light-off. In one example approach, heat stored in a phase-change material in a heat battery is delivered to a heat exchanger with a bypass coupled in an exhaust system at engine start-up. After exhaust temperature exceeds a first threshold, heat is delivered from the heat battery to a vehicle cabin and optionally to other vehicle systems requiring heat, and after exhaust temperature exceeds a second, higher threshold, heat is delivered from the heat exchanger to charge the heat battery. For example, the first threshold may be a temperature value greater than or equal to a catalytic converter light-off temperature. In this way, once catalyst light-off is achieved (such that further heating of the catalytic converter is not necessary for emissions reduction), exhaust heat may be transferred via the heat exchanger and delivered to a cabin heating system. Further, the second, higher threshold may be a temperature value at which the amount of available exhaust heat exceeds an amount of heat needed by the cabin heating system and any other vehicle systems requiring heat, such that extra heat is available for charging the heat battery.

In this way, heat stored in the heat battery may be used to expedite catalytic converter light-off after engine start-up, thereby reducing undesirable exhaust emissions, while also being available to improve cabin heating and to provide heat to other vehicle systems requiring heat. For example, heat transfer fluid may circulate heat stored in a phase-change material in the heat battery to the heat exchanger to transfer heat to engine exhaust upstream of a catalytic converter. As the engine warms up, exhaust temperature increases and the catalyst reaches light-off. After catalyst light-off has occurred, exhaust heat may be transferred to heat transfer fluid in the heat exchanger, and the heat transfer fluid may be circulated to a vehicle cabin heating system to heat the vehicle cabin. At this stage, exhaust heat may also be transferred via circulation of heat transfer fluid to one or more other vehicle systems requiring heat, such as the transmission for heating of transmission oil. As the engine warms up further, which causes exhaust temperature to increase further, heat transfer fluid may be circulated from the heat exchanger to a phase-change material in the heat battery, to charge the heat battery. Charging the heat battery in this way enables heat to be stored for delivery to the heat exchanger at a subsequent engine start-up, and can reduce cooling loads for at least a duration. Thus, in accordance with this example method, unwanted exhaust emissions that occur prior to catalytic converter light-off may be reduced. Further, excess exhaust heat may be advantageously utilized rather than vented to the environment as wasted fuel energy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to methods for utilizing a heat transfer system to advantageously reuse exhaust waste heat to expedite catalytic converter light-off, passenger cabin warming, and heat delivery to other vehicle systems. The following description further relates to a diesel-powered truck, such as that shown in FIG. 1, which is configured to utilize the heat transfer system to perform such methods.

Figure 1:
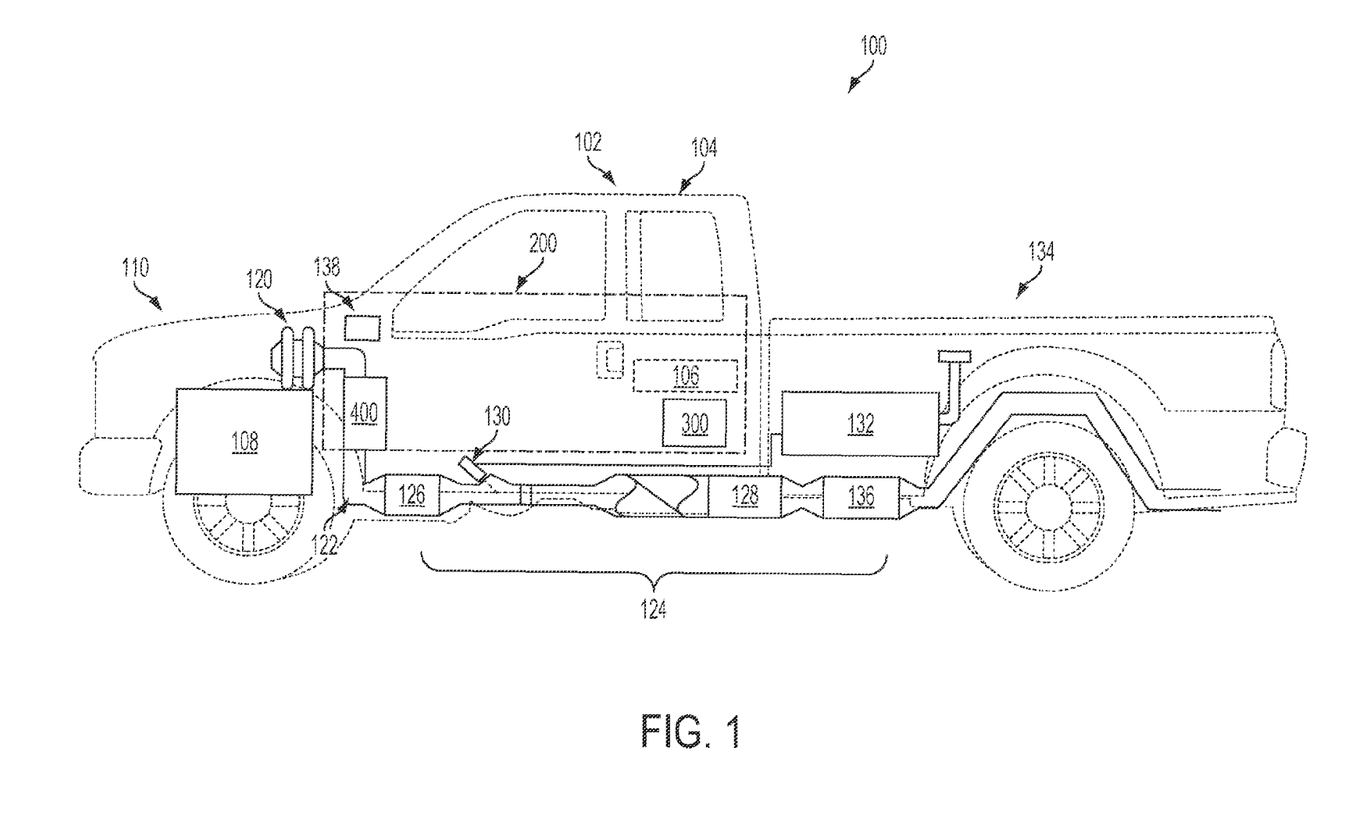
FIG. 1 is a side view depicting the positions of various components of the heat transfer system of FIG. 2 in a diesel-powered truck with a crew cab.

FIG. 1 depicts a side view of a diesel-powered truck 100 with a "crew cab" style cabin 102. While this example utilizes a compression ignition diesel engine, the engine may also be a gasoline spark-ignited engine, or others. Also, while a truck is illustrated, the vehicle may also be a passenger vehicle, or other type of vehicle.

Cabin 102 includes a rear passenger compartment 104 including a rear bench seat 106. Truck 100 includes an engine 108, positioned in a forward engine compartment 110 of truck 100. Engine 108 may include a compression device such as a turbocharger including at least a compressor arranged along an intake passage of the engine. The compressor may be at least partially driven by a turbine 120 (e.g. via a shaft) arranged along an engine exhaust passage 122.

A controller 138 of truck 100 controls one or more functions of the engine and other vehicle systems, such as fuel injection timing and/or amounts, ignition timing, valve opening/closing, and various others. Controller 138 may be located in various positions in the vehicle. In the example of FIG. 1, the controller is located proximal to cabin 102. However, the controller may also be located be proximate to or adjacent engine 108 or forward engine compartment 110, for example.

Figure 2:
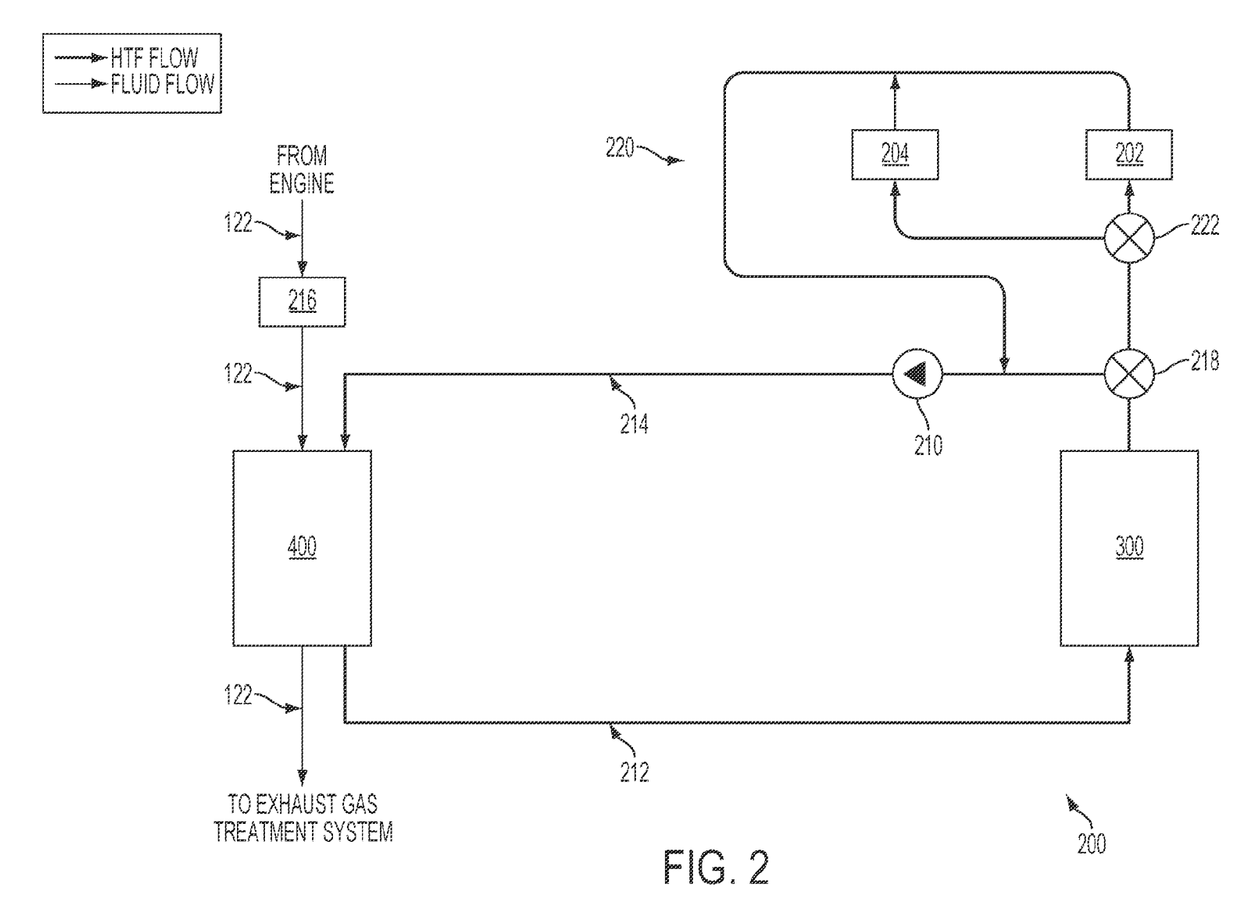
FIG. 2 schematically shows an example heat transfer system that may be included in the diesel-powered truck of FIG. 1.
Figure 3A:
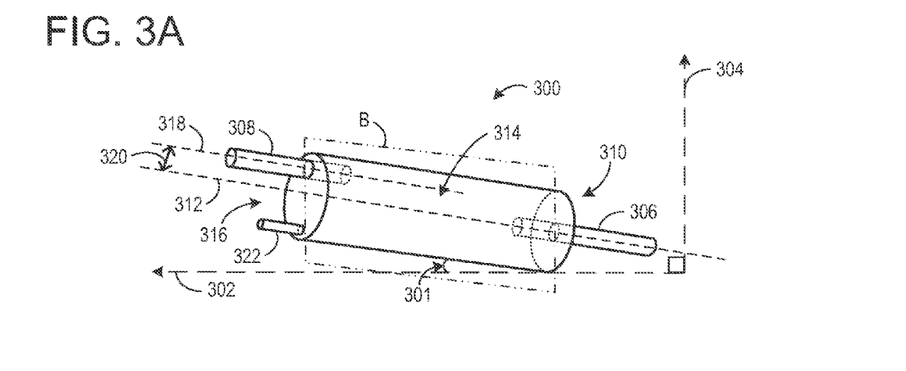
FIGS. 3A-3B show an example embodiment of a heat battery that may be included in the heat transfer system of FIG. 2.
Figure 3B:
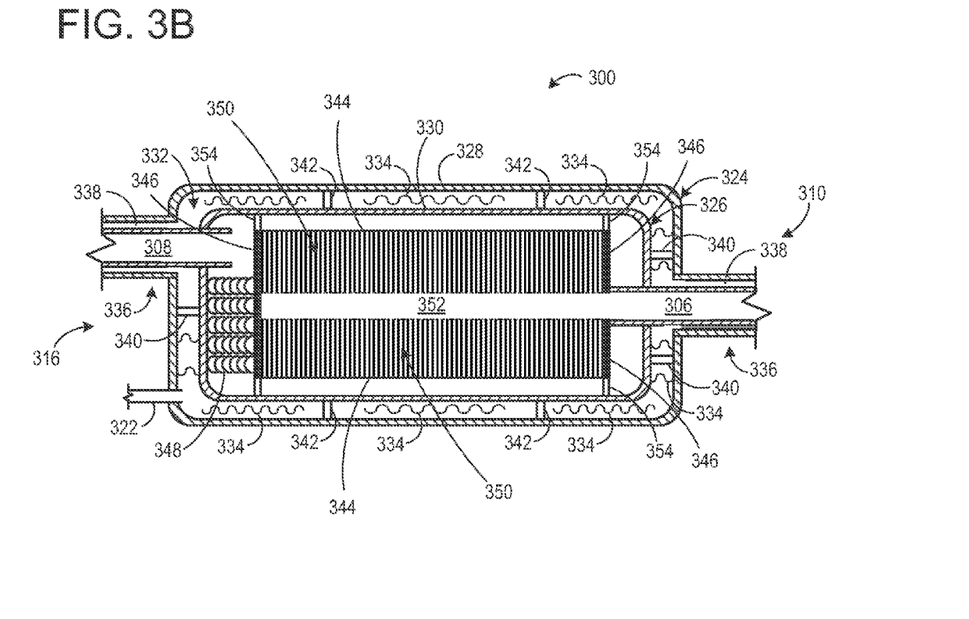

Truck 100 includes a heat transfer system 200, which is described in further detail with respect to FIG. 2, including a heat battery 300, which is described in further detail with respect to FIGS. 3A-3B. Heat battery 300 is positioned beneath rear bench seat 106. Heat battery 300 may store heat recovered from the exhaust system. For example, the heat battery may store heat in a phase-change material (PCM) that absorbs heat when changing state from solid to liquid and releases heat when changing state from liquid to solid. Further, the heat battery may be insulated to reduce dissipation of heat stored therein. For example, the heat battery may be insulated via a vacuum jacket.

Figure 4:
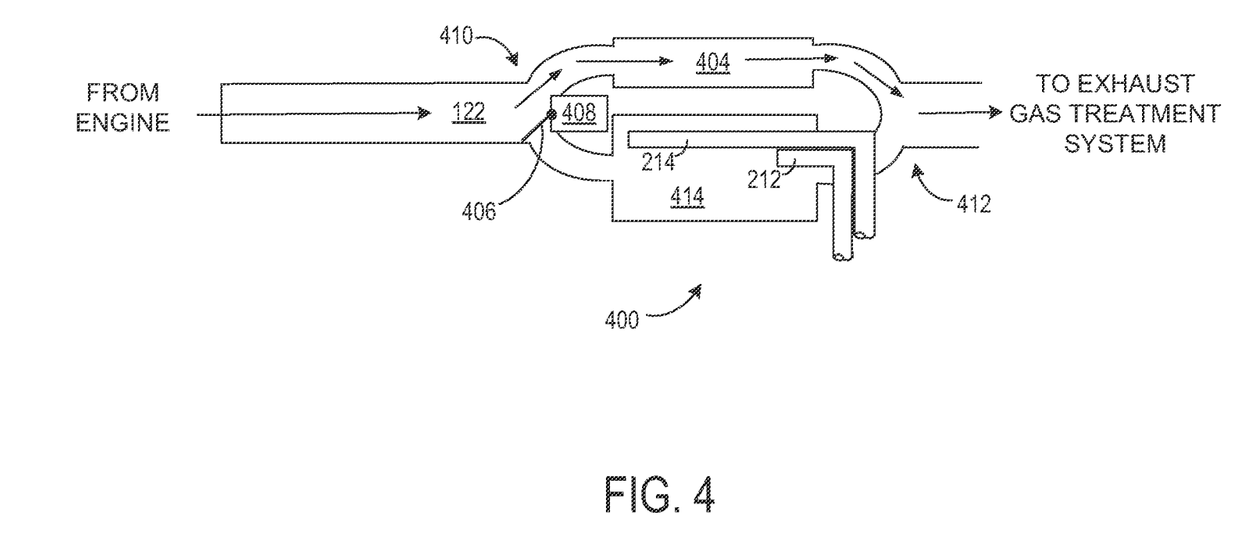
FIG. 4 schematically shows an example embodiment of a heat exchanger that may be included in the heat transfer system of FIG. 2.

Heat transfer system 200 further includes a heat exchanger 400, which is described in further detail with respect to FIG. 4. Heat exchanger 400 is arranged along exhaust passage 122 in forward engine compartment 118, downstream of turbine 120. The heat exchanger includes heat transfer tubing, and heat transfer fluid (HTF) flows in the tubing. As detailed with respect to FIG. 4, exhaust gas flows inside a heat transfer section of the heat exchanger to receive heat from, or deliver heat to, the HTF in the tubing. Further, heat exchanger 400 includes a bypass section through which exhaust gas may flow in conditions where heat exchange is not desired. A bypass mechanism in the heat exchanger may be controlled to direct the flow of exhaust gas through either or both of the heat transfer section and the bypass section. In one example, the heat transfer portion may be rectangular, and the bypass section may be cylindrical.

It is to be understood that heat transfer system 200 includes various pipes for circulation of HTF. These pipes are schematically shown in FIG. 2, as detailed below. In one example, heat is stored in the heat battery from previous engine operation. The stored heat may be delivered from the heat battery to the heat exchanger by circulating HTF from the heat battery to the heat exchanger via the pipes. Because heat may be delivered by circulating HTF in the pipes in this way, the heat battery may be advantageously positioned under rear bench seat 106, where there is ample room for a large heat battery with a correspondingly large heat storage capacity. Further advantages may be achieved by positioning the heat exchanger in forward engine compartment 110, proximal to an engine exhaust manifold (not shown) such that exhaust heat may be transferred to HTF circulating in the heat exchanger very soon after exiting the exhaust manifold (and thus before substantial heat loss has occurred).

Additionally, truck 100 includes an exhaust gas treatment system 124 including one or more catalytic converters arranged along exhaust passage 122 downstream of heat exchanger 400, in an underbody of the truck. For example, exhaust gas treatment system 124 may include a diesel oxidation catalyst (DOC) 126. Downstream of DOC 126, exhaust gas treatment system 124 may include an exhaust gas treatment device 128. Exhaust gas treatment device 128 may be a selective catalyst reduction (SCR) system, for example.

In other examples, the exhaust gas treatment system may additionally or alternatively include a three way catalyst (TWC), a $NO_x$ trap, various other emission control devices, or combinations thereof. Further, as depicted, exhaust fluid injector 130 is disposed upstream of exhaust gas treatment device 128. Exhaust fluid injector 130 may inject an exhaust fluid into the exhaust stream for reaction with $NO_x$ in exhaust gas treatment device 128 responsive to signals received from a controller (not shown). The exhaust fluid may be a reductant, for example, such as urea or ammonia, which is stored in tank 132. As shown, tank 132 may be positioned under a bed 134 of truck 100. Further, a diesel particulate filter (DPF) 136 may be arranged in exhaust passage 122 downstream of exhaust gas treatment device 128.

FIG. 2 schematically shows an example configuration of heat transfer system 200. including heat exchanger 400 and heat battery 300. FIG. 2 includes similar features as FIG. 1, and like features are indicated with common reference numbers.

As shown, HTF may circulate between the various components of heat transfer system 200. Further, HTF may thermally transfer heat to a fluid of a cabin heating system 202. Cabin heating system 202 may provide heat to cabin 102, such that a vehicle operator and any passengers may occupy the cabin at a comfortable temperature. For example, to vent heat to cabin 102, cabin heating system 202 may include various components which are not shown. For example, cabin heating system 202 may include a fan, a heater core (which may store heat transferred from HTF of heat transfer system 200), and other components that are pertinent to heating the cabin (e.g., a cabin vent, a heating conduit coupling the heater core to the vent, etc.). The fan may be directed at the heater core in any suitable orientation to transfer heat to the passenger cabin via convection. Specifically, the fan may blow air (fresh air or air recirculated from the cabin) across the heater core to transfer heat to the air, before blowing the air into the cabin.

Further, HTF may thermally transfer heat to fluid(s) of one or more other vehicle systems 204 which require heat.

Arrows 206 generally indicate a direction of HTF flow, and arrows 208 generally indicate a direction of fluid flow for each vehicle system. As detailed below, a pump 210 may drive HTF flow in a first heat transfer loop between heat battery 300 and heat exchanger 400. Further, it will be appreciated that other driving mechanisms may drive HTF flow through the heat transfer system, and fluid flow through the various vehicle systems. For example, each vehicle system may have a pump fluidically coupled to the fluid flow.

As shown, heat transfer system 200 includes heat exchanger 400 to recover heat from exhaust flowing in exhaust passage 122. Heat exchanger 400 is thermally coupled to exhaust passage 122 at a position between engine 108 and exhaust gas treatment system 124. Heat exchanger 400 is coupled to heat battery 300 via HTF return connection 212 and HTF supply connection 214. Together, HTF return connection 212 and HTF supply connection 214 constitute a first heat transfer loop. In this way, HTF may circulate between heat exchanger 400 and heat battery 300 to exchange heat between PCM in heat battery 300 and exhaust gas flowing through heat exchanger 400. Specifically, heat exchanger 400 is thermally coupled to an outlet of heat battery 300 via HTF return connection 212, and to an inlet of heat battery 300 via a HTF supply connection 214. For example, heat battery 300 may deliver heat stored in PCM to heat exchanger 400 by circulating HTF to heat exchanger 400 via HTF return connection 212. In this way, heat stored in heat battery 300 may be used to increase a temperature of the exhaust flow upstream of exhaust treatment system 124, such that a time to reach catalytic converter light-off is reduced. Similarly, heat exchanger 400 may deliver exhaust heat to heat battery 300 by circulating HTF to PCM in heat battery 300 via HTF supply connection 214. In this way, HTF may be heated by the exhaust flow to recharge the thermal capacity of heat battery 300. This heat may be used to recharge the heat battery such that it stores heat for use at a subsequent engine start to reduce catalytic converter light-off delay, and to reduce delay in availability of heat for use in the cabin heating system or other vehicle systems requiring heat. It may be advantageous to recharge heat battery 300 in this way when a temperature of the heat storage device is below a threshold value—for example, after the heat battery has discharged its thermal capacity, and/or after the various vehicle systems are sufficiently warm.

As shown in FIG. 2, HTF supply connection 214 includes a pump 210 to induce a flow of HTF from heat battery 300 to heat exchanger 400. A similar pump (not shown) may be included in HTF return connection 212 to induce a flow of HTF from the heat exchanger to the heat battery. The HTF in the tubing may be the same HTF that flows in HTF fluid supply and return connections 214 and 212. As another example, the HTF in the tubing may be a different fluid.

Control of heat transfer system 200 may depend upon the temperature of exhaust flowing in exhaust passage 122, among other factors. Exhaust temperature may be measured by one or more temperature sensors located in exhaust passage 122. For example, temperature sensor 216 may measure exhaust temperature upstream of heat exchanger 400 as depicted in FIG. 2. Alternatively, exhaust temperature may be inferred based on engine operating conditions such as speed, load, air-fuel ratio (AFR), injection retard timing, etc. Further, exhaust temperature may be computed by one or more exhaust gas sensors. It may be appreciated that the exhaust gas temperature may alternatively be estimated by any combination of temperature estimation methods listed herein.

As shown in FIG. 2, a first valve 218 is positioned in heat transfer tubing at a downstream end of heat battery 300. The position of first valve 218 may be controlled via a controller (not shown) to direct a flow of HTF to either or both of HTF supply connection 214 and an HTF conduit system 220. HTF conduit system 220 couples heat battery 300 to cabin heating system 202 in a second heat transfer loop, and optionally to one or more other vehicle systems 204 in a third heat transfer loop, depending on the position of a second valve 222 arranged in HTF conduit system 220 downstream of first valve 218. The position of second valve 222 may be controlled via a controller (not shown) based on the temperature of exhaust in exhaust passage 122 upstream of heat exchanger 400, for example. For example, when exhaust temperature exceeds a threshold, first valve 218 may be controlled to close the first heat transfer loop, such that HTF from the heat battery only flows into HTF conduit system 220. In this case, second valve 222 may be controlled to allow HTF to flow from the heat battery in the second heat transfer loop only, to deliver heat to the cabin heating system 202. For example, HTF in HTF conduit system 220 may be thermally coupled (e.g., in thermal contact) with a fluid of the cabin heating system 202 to transfer heat to the system. Alternatively, second valve 222 may be controlled to allow HTF to flow from the heat battery in the second heat transfer loop and the third heat transfer loop, such that heat may also be delivered to one or more other vehicle systems. For example, heat may be delivered to one or more of a transmission, a driveline differential, a heat-driven adsorption air-conditioning system, and an electric battery via the third heat transfer loop. That is, HTF in HTF conduit system 220 may be thermally coupled (e.g., in thermal contact) with a fluid of one or more of the transmission, the driveline differential, the heat-driven adsorption air-conditioning system, and the electric battery to transfer heat to each respective system.

As shown in FIG. 2, the second and third heat transfer loops may merge downstream of the cabin heating system and the one or more other vehicle systems. As shown, after merging, the second and third heat transfer loops may terminate directly upstream of pump 210 in HTF supply connection 214. In this way, HTF may be cycled back to the first heat transfer loop, such that it may be replenished by exhaust heat at heat exchanger 400 and then circulated back to heat battery 300 via HTF return connection 212.

It is to be understood that for cabin heating system 202 and for each of the one or more other vehicle systems, only a fluid conduit (e.g., a coolant passage) is in thermal contact with the HTF conduit. In this way, heat transfer occurs at the heat exchanger and heat battery, but not at the cabin heating system or other vehicle systems to which heat may be delivered.

The heat transfer system depicted in FIG. 2 may achieve various advantages depending on the positioning of its components. For example, as shown in FIG. 1, heat battery 300 may be positioned under rear bench seat 106. Because there may be ample room under rear bench seat 106, the heat battery may be of a large size and thus may have a relatively large storage capacity. Further advantages may be achieved by positioning heat exchanger 400 in forward engine compartment 110, proximal to an engine exhaust manifold (not shown) such that exhaust heat may be transferred from engine exhaust to HTF circulating in the heat exchanger very soon after the exhaust exits the exhaust manifold (and thus before substantial heat loss has occurred).

It will be appreciated that heat transfer system 200 is provided by way of example, and thus, is not meant to be limiting. Therefore, it is to be understood that heat transfer system 200 may include additional and/or alternative features than those illustrated in FIG. 2 without departing from the scope of this disclosure.

FIGS. 3A-3B show a heat battery 300 according to an embodiment of the present disclosure. FIG. 3A shows a perspective exterior view and FIG. 3B shows a perspective cross-sectional view of heat battery 300 taken along plane B.

Referring first to FIG. 3A, heat battery 300 may be a cylindrical shape. In other words, heat battery 300 may have a circular cross section. Further, heat battery 300 may be tilted by an angle 301 from a horizontal. Such an angle may facilitate efficient heat transfer through the device. As used herein, the horizontal refers to the ground over which the vehicle travels. For example, FIG. 3A shows a horizontal axis 302 and a vertical axis 304. The vertical axis may be orthogonal to the horizontal axis. Therefore, the vertical axis may be orthogonal to the ground over which the vehicle travels. As shown, heat battery 300 may be tilted angle 301 from horizontal axis 302. In some embodiments, heat battery 300 may be tilted 5° from the horizontal; however, it will be appreciated that other angles are possible without departing from the scope of this disclosure. Further, in some embodiments, heat battery 300 may not be tilted. For example, heat battery 300 may be level with the horizontal. In other words, angle 301 may be zero degrees.

As shown, heat battery 300 includes an inlet passage 306 and an outlet passage 308. The inlet and outlet passages may carry HTF. Further, the heat battery may house a PCM.

Inlet passage 306 may be coupled to heat battery 300 at a central position. For example, inlet passage 306 may be coupled to a first end 310 of heat battery 300 at the central position. In other words, inlet passage 306 may have a central axis 312 that is shared with a central axis of end 310, and further, shared with a central axis of heat battery 300. Inlet passage 306 may be configured to supply heat battery 300 with heat recovered from the exhaust system, for example. In some embodiments, inlet passage 306 may be coupled to a pump (not shown) to drive a movement of the HTF therein. Further, inlet passage 306 may include a portion that extends into an interior 314 of heat battery 300. Heat exchanger 400, which is described in detail with respect to FIG. 4, is positioned upstream from inlet passage 306.

Outlet passage 308 may be coupled to heat battery 300 at a top position. For example, outlet passage 308 may be coupled to a second end 316 of heat battery 300 at the top position. In other words, outlet passage 308 may have a central axis 318 that is a distance 320 from shared central axis 312 in a vertical direction (e.g., along vertical axis 304). In this way, outlet passage 308 is positioned towards a periphery of end 316, rather than centrally located, to advantageously reduce bubble accumulation in the HTF. However, in some embodiments, outlet passage 308 may be centrally located at end 316, if desired. Outlet passage 308 may include a portion that extends into the interior 314 of heat battery 300. Further, outlet passage 308 may be configured to transfer heat from heat battery 300 to heat exchanger 400, cabin heating system 202, and one or more other vehicle systems 204 requiring heat.

As shown, heat battery 300 includes a vacuum passage 322. For example, vacuum passage 322 may be coupled to heat battery 300 at end 316. Vacuum passage 322 may be coupled to both heat battery 300 and a vacuum pump (not shown). For example, in some embodiments, heat battery 300 may include a vacuum jacket, and vacuum passage 322 may be a conduit for evacuating an airspace within the vacuum jacket. In this way, a pressure within at least a portion of interior 314 may be reduced. In some embodiments, the pressure within interior 314 may be reduced to 1 microbar or less.

FIG. 3B shows a perspective interior view of heat battery 300. As shown, heat battery 300 may be double walled. In other words, heat battery 300 may include an outer vessel 324 and an inner vessel 326. For example, heat battery may include outer walls 328 and inner walls 330. Further, heat battery 300 may include vacuum jacket 332 positioned between outer walls 328 and inner walls 330. As described above, vacuum passage 322, along with a vacuum pump, may suction air out of vacuum jacket 332 such that a pressure within vacuum jacket 332 is reduced.

Vacuum jacket 332 may hold a reduced pressure around an exterior of inner vessel 326 when a vacuum is applied. By applying a vacuum, water vapor and other gaseous compounds can be evacuated from the surfaces of the insulating layers as hot fluid is pumped through the HTF passages. Further, vacuum jacket 332 may include one or more anti-radiation foils 334 that reduce heat loss to the surrounding environment via radiation.

It will be appreciated that the perspective view of FIG. 3B shows a longitudinal cross section of the heat battery 300, thus it will be appreciated that outer walls 328, inner walls 330, and vacuum jacket 332 extend circumferentially around a perimeter of heat battery 300 and longitudinally, for example, along axis 312.

Further, at least a portion of inlet passage 306 and outlet passage 308 may be double walled and include a vacuum space. For example, portions 336 exterior to heat battery 300 may be double walled similar to the inner and outer vessels. Further, vacuum spaces 338 of the inlet and outlet passages may coalesce with vacuum jacket 332 of the heat battery.

Heat battery 300 may include one or more axial supports 340. Axial supports 340 may couple inner vessel 326 to outer vessel 324 such that the inner vessels is suspended and supported within the outer vessel. As shown, axial supports 340 may be coupled to outer walls 328 and inner walls 330, and thus, may be positioned within vacuum jacket 332. The axial supports may be composed of a material with low heat conducting properties. For example, axial supports 340 may be composed of titanium or a composite including titanium or another material with low heat conducting properties. Further, in some embodiments the axial supports may be perforated to further reduce heat loss to the surrounding environment.

Further, the inner vessel may be additionally and/or alternatively supported by radial supports 342. Such radial supports may be located circumferentially at various positions. As shown, radial supports 342 may be coupled to outer walls 328 and inner walls 330, and thus, may be positioned within vacuum jacket 332. Similar to the axial supports, the radial supports 342 may be composed of titanium or a composite including titanium or another material with low heat conducting properties. Further, in some embodiments the radial supports may be perforated to further reduce heat loss to the surrounding environment.

As shown, heat battery 300 includes two axial supports at end 310, one axial support at end 316, and four radial supports 342. It will be appreciated that the number of axial and radial supports shown is non-limiting and another number of supports and/or another configuration of supports is possible without departing from the scope of this disclosure. The supports are provided to illustrate a general concept of a configuration enabling heat battery 300 to withstand gravitational acceleration forces that may occur when the heat battery 300 is rigidly coupled to the vehicle body.

Heat battery 300 may further include a PCM stack 344 supported between retention plates 346 via one or more springs 348. PCM stack 344 may include a plurality of PCM elements 350 arranged radially about a central feed passage 352. In some embodiments, the configuration of the PCM stack is such that the PCM stack retains 80% of stored heat for at least 16 hours, which may be used as a heat source at engine start to expedite catalyst light-off and vehicle cabin heating, and to provide heat to other vehicle systems requiring heat, as described above. Further, heat stored in PCM stack 344 may be discharged without starting the engine. For example, PCM stack discharge may be initiated remotely and does not necessarily have to coincide with engine start. However, PCM stack discharge may be initiated remotely along with engine start, for example, using a remote starter to start engine 108.

The plurality of PCM elements 350 may include PCM capable of storing a large quantity of heat in a form of a latent heat of fusion. Since the plurality of PCM elements 350 are surrounded by the double wall configuration, heat storing capabilities are enhanced. In other words, the double wall configuration acts like a thermos to retain heat stored within the plurality of PCM elements 350. In some embodiments, each PCM element may include the same PCM, and thus, the PCM stack may have one phase-transfer temperature. In other embodiments, the PCM stack may include PCM elements with different PCM, wherein each different PCM has a different phase-transfer temperature. In such an example, a time to charge the PCM stack may be reduced. In other words, the time for the PCM stack to reach a maximum heat-storing potential may be reduced.

As shown, heat transfer fluid may be delivered to PCM stack 344 via centrally located inlet passage 306, and further, via center feed passage 352. Thus, it will be appreciated that inlet passage 306 is in fluidic communication with center feed passage 352. Thus, HTF flows radially from center feed passage 352 to the plurality of PCM elements 350. HTF exits the heat battery via outlet passage 308 arranged in the top position, as described above.

As the HTF flows through the PCM stack, a pressure drop occurs. To reduce the pressure drop, the inlet passage 306 and the outlet passage 308 are straight. In other words, the inlet passage 306 and the outlet passage 308 do not include bends. Further, the inlet passage 306 and the outlet passage 308 do not include corrugations. Due to the absence of corrugations, a rate of heat loss may potentially increase. However, since the inlet and outlet passages include a vacuum space around a circumference of these passages, such a potential for heat loss is reduced.

As shown, retention plates 346 may be positioned at either end of PCM stack 344. For example, one retention plate 346 may be positioned proximate to end 310, and another retention plate 346 may be positioned proximate to end 316. Retention plates 346 may be a circular shape and may have a diameter that is approximately equal to a diameter of PCM stack 344. As another example, retention plates 346 may have a larger diameter or a smaller diameter than PCM stack 344. The retention plates may be coupled to the inner vessel via one or more plate extensions with windows 354 to allow HTF to reach outlet passage 308. Six axial rods (not shown) allow retention of the PCM stack in the radial and circumferential directions. The rods are welded to the retention plates. As such, the PCM stack is retained inside inner vessel 326 to reduce the potential for stack element sliding and/or rotation during vehicle operation.

Further, one or more springs 348 may further maintain the position of the PCM stack. As shown, one or more springs 348 may be positioned proximate to end 316 between retention plate 346 and inner walls 330. Springs 348 may be configured to ensure proper contact between the PCM elements during thermal expansion and thermal compression that results from the HTF heating and cooling. In some embodiments, springs 348 may have a combined force of 100 Newtons or higher to maintain proper contact between the PCM elements. As shown in FIG. 3B, heat battery 300 may include five springs; however the heat battery may include more than five springs or less than five springs, if desired.

FIG. 4 schematically shows an example embodiment of heat exchanger 400. Heat exchanger 400 includes a heat transfer section 402, a bypass section 404, and a bypass mechanism 406 which may be controlled to direct the flow of exhaust through one or both of the heat transfer section and the bypass section. In one embodiment, bypass mechanism 406 may be a butterfly valve. While the heat exchanger illustrated in FIG. 4 includes a vacuum actuator 408 coupled to bypass mechanism 406, which controls the position of the bypass mechanism, bypass mechanism 406 may alternatively be a passive mechanism.

Heat transfer section 402 includes heat transfer tubing (not shown), and HTF flows in the tubing. The heat transfer tubing may carry HTF supplied by an engine-driven pump to flow inside the tubing. As another example, the heat transfer tubing may carry HTF supplied by an electrically-driven pump to flow inside the tubing.

Heat exchanger 400 further includes an inlet end 410 in communication with an upstream portion of exhaust passage 122, and an outlet end 412 in communication with a downstream portion of exhaust passage 122. Inlet end 410 may be vertical to outlet end 412 (e.g., inlet end 410 may be closer to the hood of the vehicle, whereas outlet end 412 may be closer to the ground upon which the vehicle travels, such that the heat exchanger is vertically oriented with respect to the surface on which the vehicle travels). As described above with respect to FIG. 2, heat exchanger 400 includes HTF return connection 212 and HTF supply connection 214. In the depicted embodiment, HTF return connection 212 and HTF supply connection 214 are coupled to a top surface 414 of the heat transfer section. Specifically, HTF supply connection 214 may be coupled to the top surface 414 of the heat transfer section at a location proximal to inlet end 410, and HTF return connection 212 may be coupled to the top surface of the heat transfer section at a location proximal to outlet end 412. In this way, at engine start, heat may be delivered to the exhaust as soon as it enters heat transfer section 402. Further, after exhaust temperature has increased, heat transferred from the exhaust to HTF in the heat transfer section may be circulated to heat battery 300. Alternatively, it is anticipated that the HTF supply and return connections may be coupled to heat transfer section 402 at other locations.

In some embodiments, heat exchanger 400 is a liquid-to-gas heat exchanger.

Further, FIG. 4 schematically shows the flow of exhaust through heat exchanger 400. Heat exchanger 400 may be thermally coupled to exhaust passage 122 at a position between engine 108 and exhaust gas treatment system 124. For example, heat exchanger 400 may be thermally coupled to exhaust passage 122 upstream from one or more catalytic converters, such as a diesel oxidation catalyst (DOC).

Heat exchanger 400 effects transfer of heat to and from the exhaust flowing through it in the following manner. First, exhaust exits engine 108 via exhaust passage 122 and enters inlet end 410 of heat exchanger 400. Then, depending on the position of the bypass mechanism, the exhaust flows through one or both of the heat transfer section and the bypass section. When bypass mechanism 406 is in a fully closed position, the mechanism directs exhaust gas flow through heat transfer section 402 of heat exchanger 400, such that exhaust heat may be transferred to HTF flowing in tubing within heat transfer section 402, and does not direct any exhaust gas flow through bypass section 404. When bypass mechanism 406 is in a fully open position, the mechanism directs exhaust gas flow through bypass section 404 of heat exchanger 400, such that exhaust heat is not transferred to HTF of heat transfer system 200. For example, bypass mechanism 406 may be opened at high exhaust flows and/or high exhaust temperatures, because exhaust backpressure may reach excessive values in these conditions. By directing exhaust gas flow through bypass section 404 instead of or in addition to heat transfer section 402, bypass mechanism 406 may mitigate excessive exhaust backpressure, and in so doing, advantageously reduce engine output losses and fuel consumption. FIG. 4 shows the bypass mechanism in the fully open position. It will be appreciated that when the bypass mechanism is in a position other than fully closed or fully open, some amount of exhaust gas will flow through both the heat transfer section and the bypass section, depending on the position of the bypass mechanism. Accordingly, the position of the bypass mechanism may be controlled to direct a desired proportion of exhaust gas flow through the heat transfer section or bypass section, for example based on engine conditions.

It will be appreciated that FIG. is shown in simplified form and that numerous variations are possible without departing from the scope of this disclosure. Further, heat battery 300 may include additional and/or alternative components than those illustrated in FIGS. 3A and 3B. Further still, it is to be understood that heat battery 300 is provided to illustrate a general concept, and thus, numerous geometric configurations are possible without departing from the scope of this disclosure.

Figure 5:
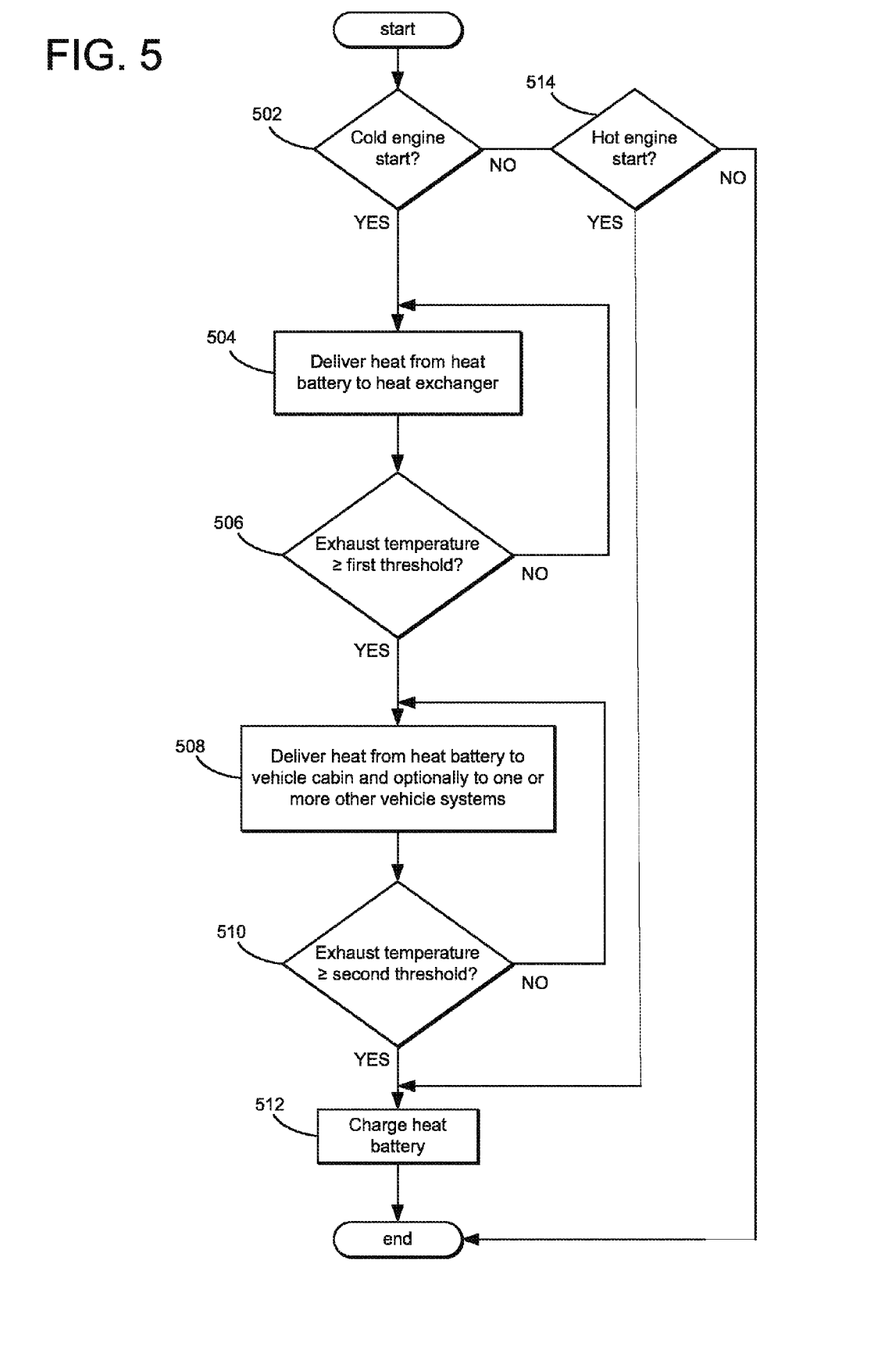
FIG. 5 shows an example method for operating the heat transfer system depicted in FIG. 2.

FIG. 5 schematically shows an example method 500 that may be used to operate heat transfer system 200.

At 502, method 500 includes determining if a cold engine start has occurred, where the engine starts from a condition in which it has cooled to ambient temperatures, as opposed to a hot engine start. If the answer to 502 is NO, method 500 continues to 514.

At 514, method 500 includes determining if a hot engine start has occurred. If the answer to 514 is YES, method 500 continues to 512 to charge heat battery 300, as detailed below. Otherwise, if the answer to 514 is NO, method 500 ends. For example, if the answer to 514 is NO, an engine start may not have occurred.

However, if the answer to 502 is YES, indicating that a cold engine start has occurred, method 500 continues to 504. At 504, method 500 includes delivering heat stored in heat battery 300 to heat exchanger 400. For example, heat stored in PCM during a previous engine operating period may be delivered by circulating HTF from the heat battery to the heat exchanger via HTF supply connection 214. Pump 210 may be controlled to effect circulation of the HTF in the HTF supply connection.

At 506, the method includes determining if exhaust temperature is above a first threshold value. For example, the exhaust temperature may be an exhaust gas temperature upstream of heat exchanger 400, and the first threshold value may be a value greater than or equal to a light-off temperature of one or more catalytic converters of exhaust gas treatment system 124. Alternatively, the first threshold value may be a value at which exhaust flow heat may be stored in heat transfer fluid for delivery to cabin 102 via cabin heating system 202, or to one or more other vehicle systems 204, while reducing delays or other adverse effects on light-off of downstream catalytic converters. If the answer to 506 is YES, method 500 continues to 508. If the answer to 506 is NO, method 500 returns to 504 to continue delivering heat from the heat battery to the heat exchanger.

At 508, method 500 includes delivering heat stored in the heat battery to cabin heating system 202 and optionally to one or more other vehicle systems 204. For example, heat stored in PCM during a previous engine operating period may be delivered by circulating HTF from the heat battery to cabin heating system 202 in the second heat transfer loop and optionally to one or more other vehicle systems 204 in the third heat transfer loop via HTF conduit system 220. In addition, heat stored in PCM during a previous engine operating period may be delivered by circulating HTF from the heat battery to one or more other vehicle systems via HTF conduit system 220. One or more valves may be controlled to distribute circulating HTF. In one embodiment, first valve 218 may be controlled to direct HTF from heat battery 300 to HTF conduit system 220, and second valve 222 may be controlled to direct HTF in HTF conduit system 220 to cabin heating system 202 alone. In another embodiment, first valve 218 may be controlled to direct HTF from heat battery 300 to HTF conduit system 220, and second valve 222 may be controlled to direct HTF in HTF conduit system 220 to cabin heating system 202 and to one or more other vehicle systems 204. Other vehicle systems 204 may include a transmission, a driveline differential, a heat-driven adsorption air-conditioning system, and an electric battery, for example. Further, one or more pumps (not shown) may be included in HTF conduit system 220 to effect circulation of HTF.

At 510, method 500 includes determining if the exhaust temperature is above a second threshold value. The second threshold value may be greater than the first threshold value. For example, the second threshold value may be a value at which the amount of available exhaust heat exceeds an amount needed by cabin heating system 202 and any other vehicle systems requiring heat. If the answer to 510 is YES, method 500 continues to 512. If the answer to 510 is NO, method 500 returns to 508 to continue delivering heat from the heat battery to cabin heating system 202 in the second heat transfer loop, and optionally to one or more other vehicle systems 204 in the third heat transfer loop.

At 512, method 500 includes recharging heat battery 300. For example, HTF may be circulated from the heat exchanger to the heat battery via HTF return connection 212. At the heat battery, HTF may enter inlet passage 306 for delivery to PCM stack 344 via center feed passage 352. PCM elements 350 of PCM stack 344 may then absorb heat from the HTF, which may cause them to change state from solid to liquid. In this way, a thermal capacity of the heat battery may be increased such that heat may be available for delivery to the heat exchanger at a subsequent engine start-up.

Figure 6:
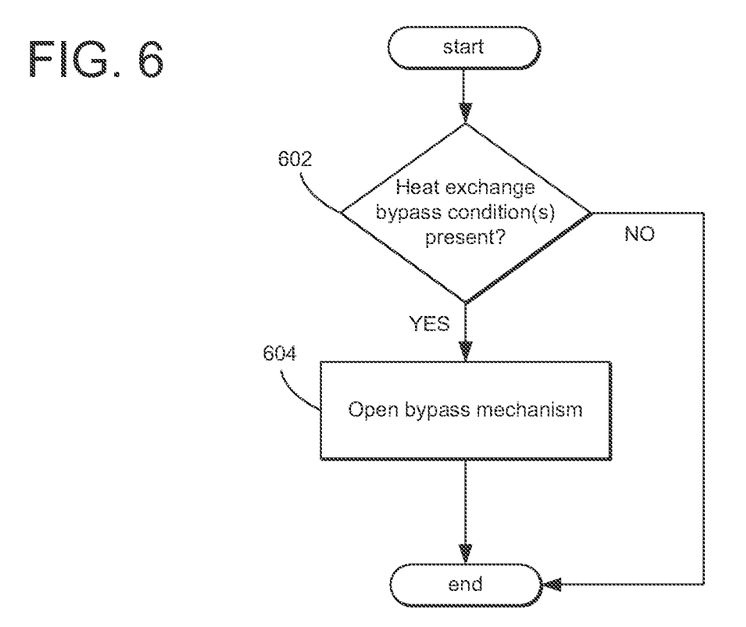
FIG. 6 shows an example method for operating the heat transfer system, to be used in conjunction with the method of FIG. 5.

FIG. 6 schematically shows an example method 600, which may be used in conjunction with method 500 to operate heat transfer system 200.

At 602, method 600 includes determining if heat exchange bypass conditions are present. The heat exchange bypass conditions may include heat exchange no longer being required. For example, heat exchange may no longer be required if the HTF circulating in heat transfer system 200 becomes too warm, which may happen when the vehicle is in operation for an extended period of time. Alternatively or additionally, the heat exchange bypass conditions may include heavy load and/or high exhaust flow operating conditions. If the answer to 602 is NO, method 600 ends. If the answer to 602 is YES, method 600 continues to 604.

At 604, bypass mechanism 406 of heat exchanger 400 is opened to direct exhaust gas entering heat exchanger 400 through bypass section 404. During certain conditions, bypass mechanism 406 may be partially opened such that only some of the exhaust gas entering heat exchanger 400 flows through bypass section 404, and the remainder of the exhaust gas entering the heat exchanger flows through heat transfer section 402. For example, heavy load and/or high exhaust flow operating conditions may be present before HTF circulating in the heat transfer system is warm enough to recharge the heat battery. In this scenario, by partially opening the bypass mechanism, exhaust backpressure may be reduced by flowing some of the exhaust through the bypass section, while heat exchange continues to occur via the remainder of the exhaust which flows through the heat transfer section, such that the heat battery may be recharged. In contrast, during other conditions, the bypass mechanism may be fully opened such that all of the exhaust gas entering the heat exchanger flows through the bypass section, and none flows through the heat transfer section. For example, the HTF circulating in heat transfer system 200 may become too warm when the vehicle is in operation for an extended period of time. In this scenario, by diverting exhaust flow through the bypass section and avoiding the heat transfer section, undesirable further warming of the HTF may be avoided.

It will be appreciated that methods 500 and 600 are provided by way of example, and thus, are not meant to be limiting. Therefore, it is to be understood that methods 500 and 600 may include additional and/or alternative steps than those illustrated in FIGS. 5 and 6, respectively, without departing from the scope of this disclosure. Further, it will be appreciated that methods 500 and 600 are not limited to the order illustrated; rather, one or more steps may be rearranged or omitted without departing from the scope of this disclosure.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the example routines may graphically represent code to be programmed into the computer readable storage medium in the controller.

The various conduits, tubing, and piping referred to herein can encompass various forms of conduits, passages, connections, etc., and are not limited to any specific cross-sectional geometry, material, length, etc.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
    at engine start-up, delivering heat stored in phase change materials in a heat battery to a heat exchanger with a bypass coupled in an exhaust system;
    after exhaust temperature exceeds a first threshold, delivering heat from the heat battery to a vehicle cabin; and
    after exhaust temperature exceeds a second, higher threshold, delivering heat from the heat exchanger to charge the heat battery.

2. The method of claim 1, further comprising, after exhaust temperature exceeds the first threshold, delivering heat from the heat battery to one or more vehicle systems.

3. The method of claim 2 wherein delivering heat from the heat battery to one or more vehicle systems comprises delivering heat from the heat battery to one or more of a transmission, a driveline differential, a heat-driven adsorption air-conditioning system, and an electric battery.

4. The method of claim 1, wherein delivering heat comprises circulating heat transfer fluid through pipes in a heat transfer loop, wherein the heat battery and the heat exchanger are fluidly coupled in a first heat transfer loop, wherein the heat battery and the vehicle cabin are fluidly coupled in a second heat transfer loop, and wherein the heat battery and the one or more vehicle systems are fluidly coupled in a third heat transfer loop.

5. The method of claim 2, further comprising:
    opening the first heat transfer loop while the second and third heat transfer loops remain closed; and
    opening the second and third heat transfer loops after exhaust temperature exceeds the first threshold.

6. The method of claim 1, wherein delivering heat stored in the heat battery to the heat exchanger at engine start-up comprises delivering heat that was stored in the heat battery during a previous engine operating period.

7. The method of claim 1, wherein delivering heat stored in the heat battery to the heat exchanger comprises circulating heat transfer fluid from the heat battery to a heat transfer section of the heat exchanger via a heat transfer fluid supply connection coupled to a top surface of the heat transfer section, and wherein exhaust flowing through the heat transfer section receives heat from the heat transfer fluid.

8. The method of claim 7, wherein delivering heat from the heat exchanger to the heat battery to charge the heat battery comprises circulating heat transfer fluid from the heat transfer section of the heat exchanger to the heat battery via a heat transfer fluid return connection coupled to the top surface of the heat transfer section.

9. The method of claim 7 further comprising, during heat exchange bypass conditions, actuating a bypass mechanism to direct at least part of the exhaust gas flow through a bypass section of the heat exchanger instead of the heat transfer section.

10. The method of claim 9 further comprising directing all of the exhaust gas flow through the bypass section during the heat exchange bypass conditions.

11. The method of claim 7, wherein the heat transfer fluid supply connection is coupled to the top surface of the heat transfer section at an end proximal to the bypass mechanism, and wherein the heat transfer fluid return connection is coupled to the top surface of the heat transfer section at an opposite end.

12. A diesel-powered truck with a crew cab, comprising:
    a heat battery, including phase changing materials, mounted under a rear bench seat of the crew cab;
    a heat exchanger coupled to an engine exhaust in a forward engine compartment, the heat exchanger comprising a heat transfer section, a bypass section, and a vacuum-actuated bypass mechanism;
    a pump circulating heat transfer fluid between the heat battery and the heat exchanger; and
    emission control devices coupled in an underbody of the truck downstream of the heat exchanger.

13. The truck of claim 12, further comprising a bypass mechanism directing exhaust gas flow to one or both of the heat transfer section and the bypass section depending on whether heat exchange bypass conditions are present.

14. The truck of claim 13, wherein the heat transfer section is coupled to heat transfer fluid supply and return connections, wherein one of the connections is coupled to a top surface of the heat transfer section at an end proximal to the bypass mechanism, and wherein the other connection is coupled to the top surface of the heat transfer section at an opposite end.

15. The truck of claim 12, wherein the heat battery is thermally coupled with a truck cabin and one or more truck systems.

16. The truck of claim 12, wherein the heat battery comprises a double-wall thermos thermally insulating an inner vessel, wherein the inner vessel is separated from an outer vessel by a vacuum jacket, wherein a stack of the phase changing materials is positioned radially about a central feed passage within the inner vessel, and wherein heat transfer fluid circulates to and from the heat battery via the central feed passage.

17. The truck of claim 15, wherein the one or more truck systems include a transmission, a driveline differential, a heat-driven adsorption air-conditioning system, and an electric battery.

18. A method for controlling a heat transfer system of a diesel-powered truck, comprising:
at engine start while exhaust gas temperature is below a first threshold, opening a first heat transfer loop directing heat transfer fluid from a heat battery containing phase change material positioned under a rear bench seat of a crew cab to a heat exchanger coupled in an engine exhaust passage at a forward engine compartment;
when exhaust gas temperature exceeds the first threshold, opening a second heat transfer loop circulating heat transfer fluid from the heat battery to a cabin of the truck, and opening a third heat transfer loop circulating heat transfer fluid from the heat battery to one or more systems of the truck requiring heat.

19. The method of claim 18, wherein delivering heat from the heat battery to one or more systems of the truck comprises delivering heat from the heat battery to one or more of a transmission, a driveline differential, a heat-driven adsorption air-conditioning system, and an electric battery.

20. The method of claim 18 further comprising, when exhaust gas temperature exceeds a second, higher threshold, circulating heat transfer fluid from the heat exchanger to the heat battery in the first heat transfer loop to charge the heat battery.

* * * * *